United States Patent
Yang et al.

(10) Patent No.: US 11,643,502 B1
(45) Date of Patent: May 9, 2023

(54) METHOD FOR PREPARING HIGH MOLECULAR WEIGHT FURAN POLYAMIDE

(71) Applicant: SICHUAN UNIVERSITY, Sichuan (CN)

(72) Inventors: Jie Yang, Sichuan (CN); Shuang Xie, Sichuan (CN); Meilin Zhang, Sichuan (CN); Zhimei Wei, Sichuan (CN); Xiaojun Wang, Sichuan (CN)

(73) Assignee: SICHUAN UNIVERSITY, Sichuan (CN)

( * ) Notice: Subject to any disclaimer, the term of this patent is extended or adjusted under 35 U.S.C. 154(b) by 0 days.

(21) Appl. No.: 17/999,020

(22) PCT Filed: Jun. 15, 2022

(86) PCT No.: PCT/CN2022/098787
§ 371 (c)(1),
(2) Date: Nov. 16, 2022

(87) PCT Pub. No.: WO2023/000871
PCT Pub. Date: Jan. 26, 2023

(30) Foreign Application Priority Data

Jul. 23, 2021 (CN) .......................... 202110835559.6

(51) Int. Cl.
*C08G 69/40* (2006.01)
*C08G 69/28* (2006.01)

(52) U.S. Cl.
CPC ............. *C08G 69/40* (2013.01); *C08G 69/28* (2013.01)

(58) Field of Classification Search
None
See application file for complete search history.

(56) References Cited

U.S. PATENT DOCUMENTS

2018/0371167 A1* 12/2018 Percec ................ B01J 31/0211

FOREIGN PATENT DOCUMENTS

| CN | 106191145 A | 12/2016 |
|----|-------------|---------|
| CN | 108699240 A | 10/2018 |
| CN | 111234207 A | 6/2020 |

(Continued)

OTHER PUBLICATIONS

Machine translation of CN112745499A, generated Mar. 3, 2023 (Year: 2023).*

(Continued)

*Primary Examiner* — Rachel Kahn
(74) *Attorney, Agent, or Firm* — Novick, Kim & Lee, PLLC; Allen Xue

(57) ABSTRACT

A method for preparing a high molecular weight furan polyamide includes the following steps: 1) charging dimethyl furan dicarboxylate and aliphatic diamine into a reaction container at equal molar weight, and increasing the temperature to 60-120° C. under inert gas; 2) adding a catalyst when the reaction system becomes transparent liquid, increasing the temperature to 140-150° C., and keeping at an atmospheric pressure or a pressure of 41-61 kPa for 0-1 h; and then increasing the temperature to 190-200° C. and reacting for 1-3 h; and 3) depressurizing the system to 3-16 kPa for 0-3 h; and finally, reducing the pressure to 0.003-0.100 KPa for 1-3 h to obtain the high molecular weight furan polyamide.

5 Claims, 3 Drawing Sheets

(56) References Cited

FOREIGN PATENT DOCUMENTS

| | | | |
|---|---|---|---|
| CN | 111925521 A | | 11/2020 |
| CN | 112029089 A | | 12/2020 |
| CN | 112062947 A | | 12/2020 |
| CN | 112745499 A | * | 5/2021 |
| CN | 113121816 A | | 7/2021 |
| CN | 113429569 A | | 9/2021 |
| JP | 2013006963 A | | 1/2013 |
| WO | 2015060718 A1 | | 4/2015 |

OTHER PUBLICATIONS

Machine translation of CN 111234207, generated Mar. 3, 2023 (Year: 2023).*

* cited by examiner

METHOD FOR PREPARING HIGH MOLECULAR WEIGHT FURAN POLYAMIDE

The present invention relates to a method for preparing a high molecular weight furan polyamide, and belongs to the field of synthesis of biobased high molecular weight materials.

BACKGROUND

The major threats and challenges facing the human living environment are climate change and biodiversity loss. Therefore, we must bid farewell to the use of fossil raw materials to decrease emission of carbon dioxide derived from fossil sources. Meanwhile, it is necessary to find renewable carbon to shift towards more sustainable and environmentally friendly production and consumption. Especially in the chemical and plastic industries, there is an increasing demand for biobased and biodegradable polymers. Among them, polyamides are widely used in the field of fiber and engineering plastics due to their good physicochemical, mechanical and thermal properties and low cost.

Semi-aromatic polyamides mostly have superior processing characteristics than aromatic polyamides, better mechanical and thermal properties than nylons, and are widely applied in the fields of marine, automotive industry, aerospace industry, oil and gas industry, electrical and electronics industry, packaging, medical devices and so on. Moreover, most polyamides are considered to be non-biodegradable polymers, however, it is potentially biodegradable if a suitable microorganism is found. Therefore, it is unquestionable that biobased polyamides will widely replace those derived from sources of petrochemical raw materials.

Furan derivatives are the currently most promising green alternatives to terephthalic acid compounds. Among them, 2,5-furandicarboxylic acid has been selected as one of the top 12 potential platform chemicals by US Department of Energy, and is a commercial renewable rigid compound. Whereas, the furan polyamide synthesized from it has been prepared for many years, but has not been commercialized, and the relevant literatures are not abundant. Meanwhile, the reported literatures have problems such as a low molecular weight of the synthesized furan polyamide, long reaction time and nongreen processes.

SUMMARY

In view of the aforementioned defects and deficiencies, the present invention adopts a catalytic and solvent-free bulk polymerization path together with a green process having specific reaction conditions to prepare simply and efficiently a fully biobased high molecular weight furan polyamide. This method can not only obtain a furan polyamide resin with high molecular weight, high thermal transition and good mechanical properties, but also avoid the use of an organic solvent, thoroughly solving the problem of environmental harm caused by the preparation process, and is also very beneficial to carbon neutralization and emission reduction of the polymer industry, facilitating solving of the problems of climate change and biodiversity loss.

The technical solution of the present invention:
the technical problem to be solved by the present invention is to provide a method for preparing a high molecular weight furan polyamide, which includes the following steps:

1) charging dimethyl furan dicarboxylate and aliphatic diamine into a reaction container with a mechanical stirring device at equal molar weight, and increasing the temperature to 60-120° C. in an inert gas environment;

2) adding a catalyst when the reaction system becomes transparent liquid; then increasing the temperature to 140-150° C., and keeping at an atmospheric pressure or a pressure of 41-61 kPa for 0-1 h; and then increasing the temperature to 190-200° C. and reacting for 1-3 h; in this step, the pressure should not be too low when the pressure is applied, and the molecular weight of the product decreases obviously and other performances also decrease obviously when the pressure is decreased to 31 KPa; and the temperature after the second temperature rise should neither be equal to or higher than 210° C. nor lower than 170° C., otherwise the molecular weight, thermal properties and mechanical properties of the polymer will be obviously reduced; and 3) finally depressurizing the reaction system to 3-16 kPa for 0-3 h; and then reducing the pressure to 0.003-0.100 KPa for 1-3 h to obtain the high molecular weight furan polyamide; wherein a total reaction time of the step 2) and the step 3) is controlled to be 7-8 hours.

Further, in the step 2), the catalyst is selected from: at least one of a guanidine catalyst, an amidine catalyst, a phosphazene catalyst, imidazole, triethanolamine or potassium tert-butoxide.

Still further, the guanidine catalyst is: 1,5,7-triazabicyclo[4.4.0]dec-5-ene, 7-methyl-1,5,7-triazabicyclo[4.4.0]dec-5-ene, 2,3,5,6-tetrahydro-1H-imidazo[1,2-A]imidazole or tetramethyl guanidine; the amidine catalyst is 1,8-diazabicyclo[5.4.0]undec-7-ene or 1,5-diazabicyclo[4.3.0]non-5-ene; and the phosphazene catalyst is 2-tert-butylimino-2-diethylamino-1,3-dimethylperhydro-1,3,2-diazaphosphorine or 1-tert-butyl-2,2,4,4,4-pentakis(dimethylamino)-2$\lambda$5,4$\lambda$5-catenadi(phosphazene).

Further, in the step 2), the use amount of the catalyst is 5%-6% of the molar weight of dimethyl furan dicarboxylate or aliphatic diamine. The use amount of the catalyst of the present invention should neither be too high nor too low, and the performance of the polymer is reduced obviously when the use amount is 7 mol %; and the catalyst should not be added into the reactor together with the monomers at the beginning, otherwise, the monomers and the catalyst will be reacted into an extremely viscous system before the catalyst is fully mixed among the monomers, so that the catalyst cannot be evenly mixed among the monomers even when they are stirred continuously thereafter, finally causing the synthesized polymer to be extremely uneven and the properties of the product to be relatively poor.

Further, in the step 1), the aliphatic diamine has a carbon atom number of 2-12.

Further, the process of the step 1) is: charging dimethyl furan dicarboxylate and aliphatic diamine into the reaction container at the equal molar weight, and purging with inert gas or vacuumizing for 5-30 min; and then at the atmospheric pressure, heating the reaction system to 60-120° C. in an inert gas atmosphere with a flow rate of 100-1,000 ml/min. Beneficial effects of the present invention:

1. The present invention employs a catalytic and solvent-free bulk polymerization method, so that the whole process has the advantages of being green, simple and high-efficiency.

2. The reaction temperature of the present invention is not higher than 200° C., which has the advantages of suppressing side reactions and saving energy.

3. The present invention is a catalytic reaction, which has the advantages of a high reaction rate and a short reaction time, thereby reducing side reactions.

4. The preparation method of the present invention does not need any solvent, and thus it does not need complicated post-treatment, and has the advantages of economy, nontoxicity, environmental protection and simplicity.

5. The present invention is a preparation method of bulk polymerization, which has good experimental repeatability and a stable process, and thus the product yield should be high.

6. The furan polyamide with high molecular weight, a high thermal transition temperature and good mechanical properties as prepared by the present invention, belongs to fully biobased environment-friendly high molecular materials, and is helpful to solve the problems of climate change and biodiversity loss.

BRIEF DESCRIPTION OF DRAWINGS

FIG. 4 is an infrared spectrogram of Examples 1, 5 and 6; and as can be seen from FIG. 4, the aggregation state of Example 6 is obviously different from those of Examples 1 and 5, but their structures are similar.

DETAILED DESCRIPTION

Figure 1:
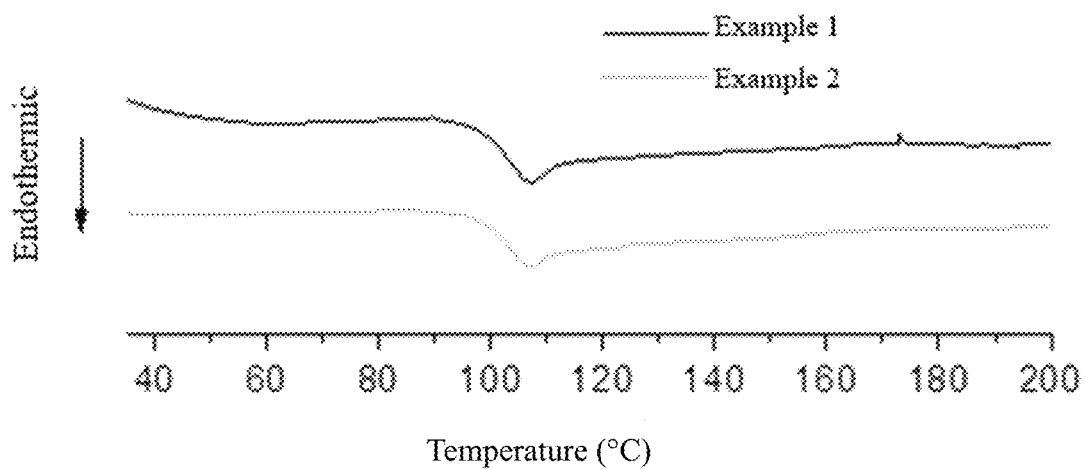
FIG. 1 shows the glass transition temperature results of Examples 1 and 2; and as can be seen from FIG. 1, the glass transition temperatures ($T_g$) of them are comparable and about 103° C.
Figure 2:
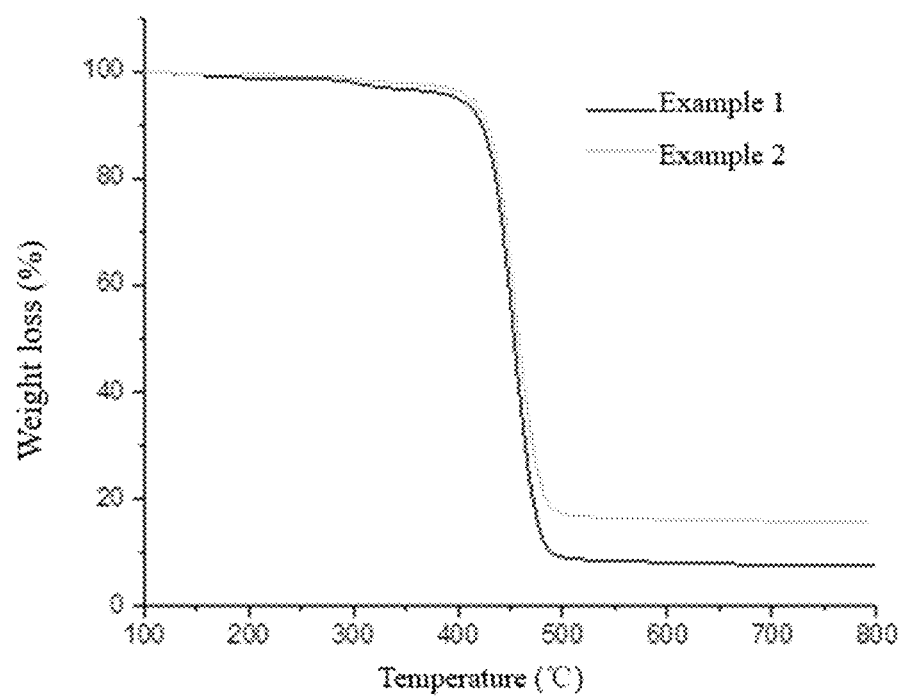
FIG. 2 shows the thermogravimetric curves of Examples 1 and 2; and as can be seen from FIG. 2, the initial decomposition temperature ($T_{d-5\%}$, mass loss of 5%) of Example 1 is 399° C., while the $T_{d-5\%}$ of Example 2 is 408° C., which is higher than the former.
Figure 3:
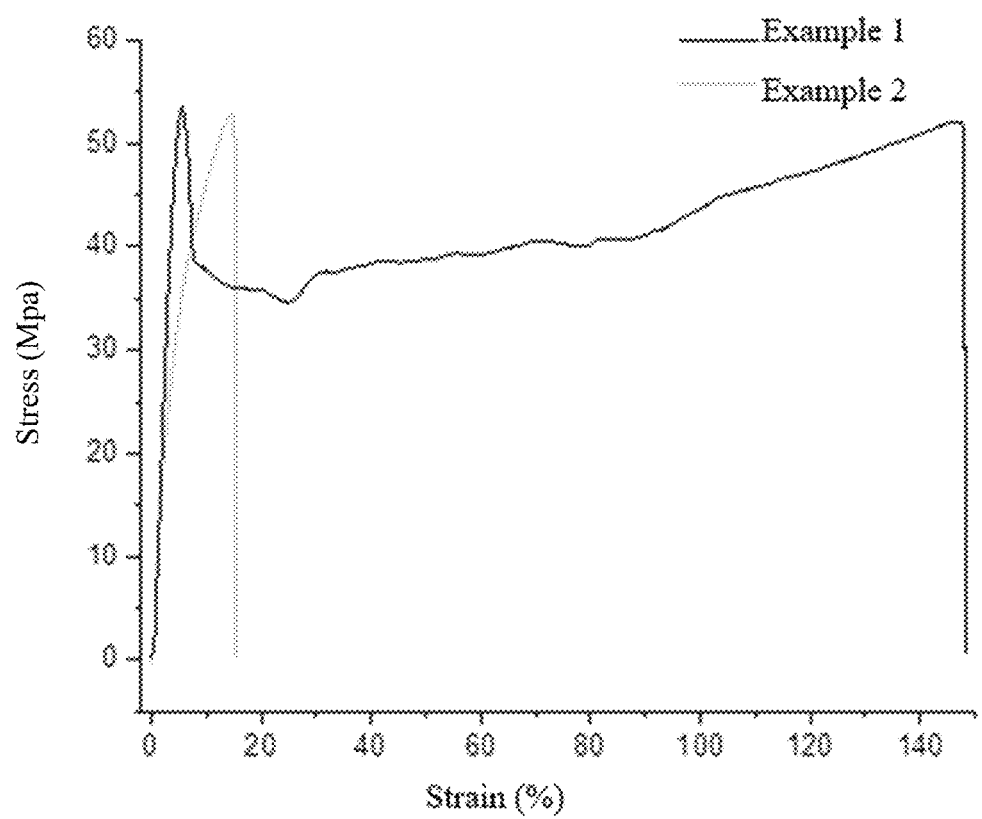
FIG. 3 shows the results of mechanical properties of Examples 1 and 2; and as can be seen from FIG. 3, Example 1 has a tensile strength (a) of 54.46 MPa, a tensile modulus (E) of 1,454 MPa, and an elongation at break (E) of 138.60%. In Example 2, a is 52.77 MPa, E is 935 MPa, and ε is 18.37%.
Figure 4:
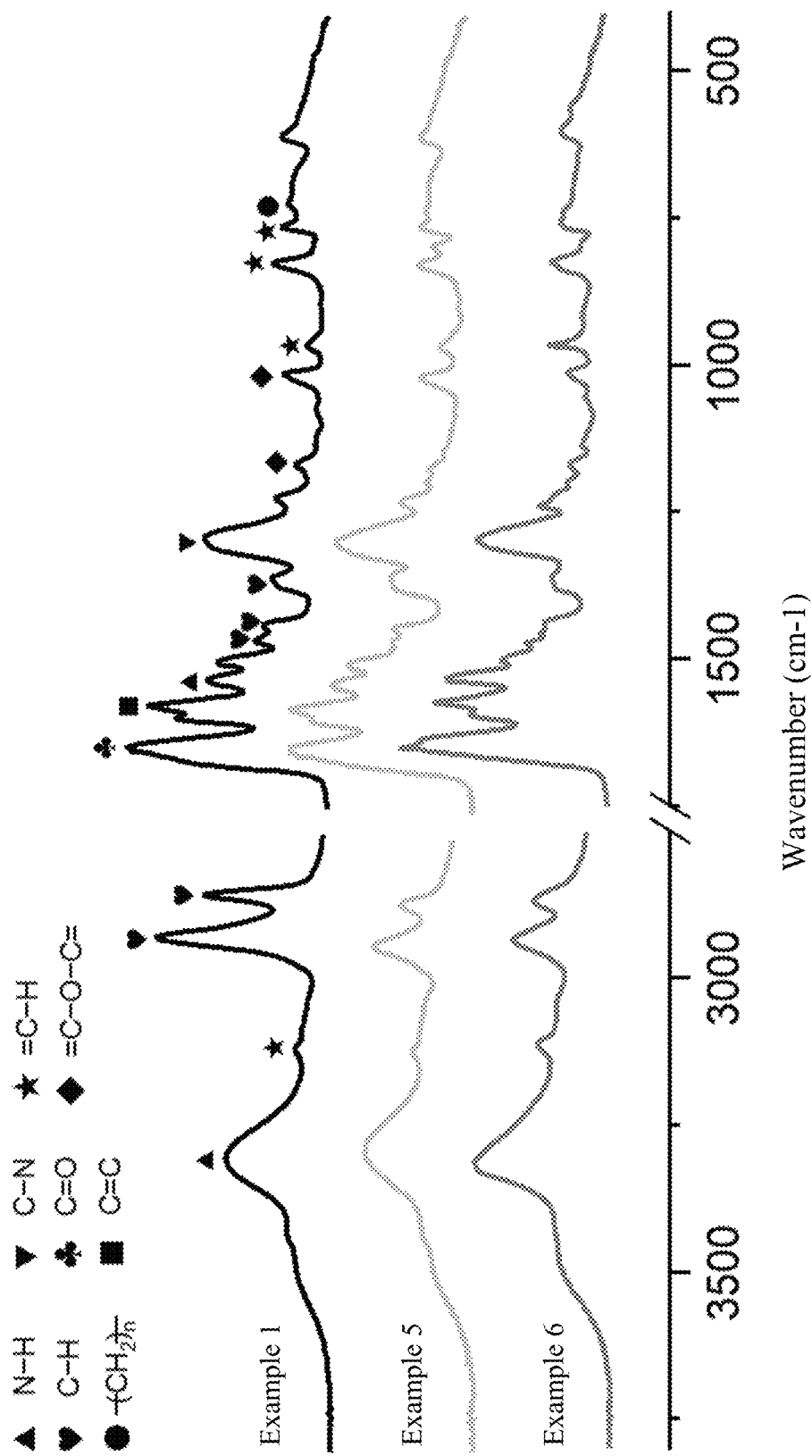

The specific embodiments of the present invention will be further described with reference to the following examples, but the present invention should not be considered as limited to the scope of the examples.

EXAMPLE 1

Into a round-bottomed flask equipped with a mechanical stirring bar charged were dimethyl furan dicarboxylate (0.0326 mol) and 1,10-diaminodecane at equal molar weight, and the round-bottomed flask was placed in an oil bath pot and purged with nitrogen for 10 min to replace the air therein; thereafter, the flow rate of nitrogen was controlled at 150-500 ml/min, and the mixture was heated to 80° C. When became transparent liquid, the mixture was added with about 5 mol % (accounting for 5% of the molar weight of the dimethyl furan dicarboxylate) of 7-methyl-1,5,7-triazabicyclo[4.4.0]dec-5-ene; the temperature was increased to 140° C. and kept for 1 h, then increased again and kept at 200° C. for 3 h; then, the pressure of the system was reduced to 3.8 KPa for 2 h; and finally, the pressure of the system was then reduced to about 0.003 KPa for 1 h to obtain a furan polymer product: a PA10F resin.

The resin product had a number average molecular weight ($M_n$) of 29,239 g/mol, a weight average molecular weight ($M_w$) of 66,100 g/mol, a polydispersity index (Đ) of 2.261, a glass transition temperature ($T_g$) of 103° C., an initial decomposition temperature (Td-5%, mass loss of 5%) of 399° C., a tensile strength (a) of 54.46 MPa, a tensile modulus (E) of 1454 MPa, and an elongation at break (E) of 138.60%. Table 1 was a table showing the performance results of each Example and Comparative Example.

EXAMPLE 2

Into a round-bottomed flask equipped with a mechanical stirring bar charged were dimethyl furan dicarboxylate (0.0326 mol) and 1,10-diaminodecane at equal molar weight, and the round-bottomed flask was placed in an oil bath pot and purged with nitrogen for 10 min to replace the air therein; thereafter, the flow rate of nitrogen was controlled at 150-500 ml/min, and the mixture was heated to 80° C. When became transparent liquid, the mixture was added with about 5 mol % (accounting for 5% of the molar weight of the dimethyl furan dicarboxylate) of 1,5,7-triazabicyclo[4.4.0]dec-5-ene; the temperature was increased to 140° C. and kept for 30 min, and then the system was depressurized to 51 KPa for 30 min; then the temperature was increased again and kept at 200° C. for 3 h; subsequently, the system was further depressurized to 4 KPa for 2 h; and finally, the pressure of the system was then reduced to about 0.003 KPa for 1 h to obtain a furan polymer product: a PA10F resin.

The resin product had a number average molecular weight of 32,605 g/mol, a weight average molecular weight of 91,877 g/mol, a polydispersity index of 2.818, a glass transition temperature of 103° C., an initial decomposition temperature of 408° C., a tensile strength of 52.77 MPa, a tensile modulus of 935 MPa, and an elongation at break of 18.37%.

EXAMPLE 3

Into a round-bottomed flask equipped with a mechanical stirring bar charged were dimethyl furan dicarboxylate (0.0326 mol) and 1,10-diaminodecane at equal molar weight, and the round-bottomed flask was placed in an oil bath pot and purged with nitrogen for 10 min to replace the air therein; thereafter, the flow rate of nitrogen was controlled at 150-500 ml/min, and the mixture was heated to 80° C. When became transparent liquid, the mixture was added with about 5 mol % (accounting for 5% of the molar weight of the dimethyl furan dicarboxylate) of 1,8-diazabicyclo[5.4.0]undec-7-ene; the temperature was increased to 140° C. and kept for 30 min, and then the system was depressurized to 41 KPa for 30 min; then the temperature was increased again and kept at 200° C. for 3 h; subsequently, the system was further depressurized to 4 KPa for 2 h; and finally, the pressure of the system was then reduced to about 0.003 KPa for 1 h to obtain a furan polymer product: a PA10F resin.

The resin product had a number average molecular weight of 26,523 g/mol, a weight average molecular weight of 59,317 g/mol, a polydispersity index of 2.236, a glass transition temperature of 101° C. and an initial decomposition temperature (mass loss of 5%) of 400° C.

EXAMPLE 4

Into a round-bottomed flask equipped with a mechanical stirring bar charged were dimethyl furan dicarboxylate (0.0326 mol) and 1,10-diaminodecane at equal molar weight, and the round-bottomed flask was placed in an oil bath pot and purged with nitrogen for 10 min to replace the air therein; thereafter, the flow rate of nitrogen was controlled at 150-500 ml/min, and the mixture was heated to 80° C. When became transparent liquid, the mixture was added with about 5 mol % (accounting for 5% of the molar weight of the dimethyl furan dicarboxylate) of 1,5-diazabicyclo[4.3.0]non-5-ene; the temperature was increased to 140° C. and kept for 30 min, and then the system was depressurized to 51 KPa for 30 min; then the temperature was increased again and kept at 190° C. for 3 h; subsequently, the system was further depressurized to 4 KPa for 2 h; and finally, the pressure of the system was then reduced to about 0.003 KPa for 1 h to obtain a furan polymer product: a PA10F resin.

The resin product had a number average molecular weight of 21,288 g/mol, a weight average molecular weight of 60,239 g/mol, a polydispersity index of 2.830, a glass transition temperature of 102° C., and an initial decomposition temperature (mass loss of 5%) of 393° C.

EXAMPLE 5

Into a round-bottomed flask equipped with a mechanical stirring bar charged were dimethyl furan dicarboxylate (0.0326 mol) and 1,5-pentanediamine at equal molar weight, and the round-bottomed flask was placed in an oil bath pot and purged with nitrogen for 10 min to replace the air therein; thereafter, the flow rate of nitrogen was controlled at 100-400 ml/min, and the mixture was heated to 80° C. When became transparent liquid, the mixture was added with about 5 mol % (accounting for 5% of the molar weight of the dimethyl furan dicarboxylate) of 1-tert-butyl-2,2,4,4,4-pentakis(dimethylamino)-2$\lambda^5$,4$\lambda^5$-catenadi(phosphazene); the temperature was increased to 140° C. and kept for 1 h, then increased again and kept at 200° C. for 3 h; and finally, the pressure of the system was then reduced to about 0.003 KPa for 3 h to obtain a furan polymer product: a PA5F resin.

The resin product had a glass transition temperature of 130° C. and an initial decomposition temperature (mass loss of 5%) of 300° C.

EXAMPLE 6

Into a round-bottomed flask equipped with a mechanical stirring bar charged were dimethyl furan dicarboxylate (0.0326 mol) and 1,4-butanediamine at equal molar weight, and the round-bottomed flask was placed in an oil bath pot and purged with nitrogen for 10 min to replace the air therein; thereafter, the flow rate of nitrogen was controlled at 100-300 ml/min, and the mixture was heated to 80° C. When became transparent liquid, the mixture was added with about 5 mol % (accounting for 5% of the molar weight of the dimethyl furan dicarboxylate) of 2,3,5,6-tetrahydro-1H-imidazo[1,2-A]imidazole; the temperature was increased to 140° C. and kept for 1 h, then increased again and kept at 170° C. for 3 h; and finally, the pressure of the system was then reduced to about 0.003 KPa for 3 h to obtain a furan polymer product: a PA4F resin.

The resin product had a glass transition temperature of 145° C., a melting temperature of primary heating of 190° C., and an initial decomposition temperature (mass loss of 5%) of 298° C.

EXAMPLE 7

Into a round-bottomed flask equipped with a mechanical stirring bar charged were dimethyl furan dicarboxylate (0.0326 mol) and 1,4-butanediamine at equal molar weight, and the round-bottomed flask was placed in an oil bath pot and purged with nitrogen for 10 min to replace the air therein; thereafter, the flow rate of nitrogen was controlled at 100-300 ml/min, and the mixture was heated to 80° C. When became transparent liquid, the mixture was added with about 5 mol % (accounting for 5% of the molar weight of the dimethyl furan dicarboxylate) of 2-tert-butylimino-2-diethylamino-1,3-dimethylperhydro-1,3,2-diazaphosphorine; the temperature was increased to 140° C. and kept for 1 h, then increased again and kept at 190° C. for 3 h; and finally, the pressure of the system was then reduced to about 0.003 KPa for 3 h to obtain a furan polymer product: a PA4F resin.

The resin product had a glass transition temperature of 110° C., a melting temperature of primary heating of 210° C., and an initial decomposition temperature (mass loss of 5%) of 316° C.

COMPARATIVE EXAMPLE 1

Into a round-bottomed flask equipped with a mechanical stirring bar charged were dimethyl furan dicarboxylate (0.0326 mol) and 1,10-diaminodecane at equal molar weight, and the round-bottomed flask was placed in an oil bath pot and purged with nitrogen for 10 min to replace the air therein; thereafter, the flow rate of nitrogen was controlled at 150-500 ml/min, and the mixture was heated to 80° C. When became transparent liquid, the mixture was added with about 5 mol % (accounting for 5% of the molar weight of the dimethyl furan dicarboxylate) of 1,5,7-triazabicyclo[4.4.0]dec-5-ene; the temperature was increased to 140° C. and kept for 30 min, and then the system was depressurized to 51 KPa for 30 min; then the temperature was not increased any more and kept at 140° C. for 3 h; subsequently, the system was further depressurized to 4 KPa for 2 h; and finally, the pressure of the system was then reduced to about 0.003 KPa for 1 h to obtain a furan polymer product: a PA10F resin.

The resin product had a number average molecular weight of 13,648 g/mol, a weight average molecular weight of 31,819 g/mol, a polydispersity index of 2.331, a glass transition temperature of 90° C. and an initial decomposition temperature (mass loss of 5%) of 353° C.

COMPARATIVE EXAMPLE 2

Into a round-bottomed flask equipped with a mechanical stirring bar charged were dimethyl furan dicarboxylate (0.0326 mol) and 1,10-diaminodecane at equal molar weight, and the round-bottomed flask was placed in an oil bath pot and purged with nitrogen for 10 min to replace the air therein; thereafter, the flow rate of nitrogen was controlled at 150-500 ml/min, and the mixture was heated to 80° C. When became transparent liquid, the mixture was added with about 5 mol % (accounting for 5% of the molar weight of the dimethyl furan dicarboxylate) of 1,5,7-triazabicyclo[4.4.0]dec-5-ene; the temperature was increased to 140° C. and kept for 30 min, and then the system was depressurized to 51 KPa for 30 min; then the temperature was increased again and kept at 210° C. for 3 h; subsequently, the system was further depressurized to 4 KPa for 2 h; and finally, the pressure of the system was then reduced to about 0.003 KPa for 1 h to obtain a furan polymer product: a PA10F resin.

The resin product had a number average molecular weight of 15,081 g/mol, a weight average molecular weight of 41,247 g/mol, a polydispersity index of 2.735, a glass transition temperature of 99° C., and an initial decomposition temperature (mass loss of 5%) of 387° C.

COMPARATIVE EXAMPLE 3

Into a round-bottomed flask equipped with a mechanical stirring bar charged were dimethyl furan dicarboxylate and 1,10-diaminodecane at equal molar weight (0.0326 mol), and the round-bottomed flask was placed in an oil bath pot and purged with nitrogen for 10 min to replace the air therein; thereafter, the flow rate of nitrogen was controlled at 150-500 ml/min, and the mixture was heated to 80° C. When became transparent liquid, the mixture was added with about 5 mol % (accounting for 5% of the molar weight of the dimethyl furan dicarboxylate) of 1,8-diazabicyclo[5.4.0]undec-7-ene; the temperature was increased to 140° C. and kept for 30 min, and then the system was depressurized to 31 KPa for 30 min; then the temperature was increased again and kept at 200° C. for 3 h; subsequently, the system was further depressurized to 4 KPa for 2 h; and finally, the pressure of the system was then reduced to about 0.003 KPa for 1 h to obtain a furan polymer product: a PA10F resin.

The resin product had a number average molecular weight of 23,905 g/mol, a weight average molecular weight of 5,5418 g/mol, a polydispersity index of 2.318, a glass transition temperature of 100° C., and an initial decomposition temperature (mass loss of 5%) of 402° C.

TABLE 1

Performances of each Example and Comparative Example

| Implementation mode | $T_g$ (° C.) | $T_m$ (° C.) | $T_{d-5\%}$ (° C.) | Mn (g/mol) | Mw (g/mol) | Đ | σ(MPa) | E (MPa) | ε(%) |
|---|---|---|---|---|---|---|---|---|---|
| Example 1 | 103 | | 399 | 29,239 | 66,100 | 2.261 | 54.46 (S = 1.92) | 1454 | 138.60 (S = 49.88) |
| Example 2 | 103 | | 412 | 32,605 | 91,877 | 2.818 | 52.77 (S = 2.05) | 935 | 18.37 (S = 5.30) |
| Example 3 | 101 | | 400 | 26,523 | 59,317 | 2.236 | | | |
| Example 4 | 102 | | 401 | 21,288 | 60,239 | 2.830 | | | |
| Example 5 | 130 | | 300 | | | | | | |
| Example 6 | 145 | 190 | 298 | | | | | | |
| Example 7 | 110 | 210 | 316 | | | | | | |
| Comparative Example 1 | 90 | | 353 | 13,648 | 31,819 | 2.331 | | | |
| Comparative Example 2 | 99 | | 387 | 15,081 | 41,247 | 2.735 | | | |
| Comparative Example 3 | 100 | | 402 | 23,905 | 55,418 | 2.318 | | | |

The invention claimed is:

1. A method for preparing a high molecular weight furan polyamide, comprising the following steps:
   1) charging dimethyl furan dicarboxylate and aliphatic diamine into a reaction container with a mechanical stirring device at equal molar weight, and increasing the temperature to 60-120° C. in an inert gas environment;
   2) adding a catalyst when the reaction system becomes transparent liquid; then heating at a temperature from 140-150° C. at atmospheric pressure or a pressure of 41-61 kPa for greater than 0 h and up to 1 h; and then increasing the temperature to 190-200° C. and reacting for 1-3 h; and
   3) finally depressurizing the reaction system to 3-16 kPa for 0-3 h; and then reducing the pressure to 0.003-0.100 KPa for 1-3 h to obtain the high molecular weight furan polyamide,
   wherein a total reaction time of the step 2) and the step 3) is controlled to be 7-8 hours, and
   wherein, in the step 2), the catalyst is selected from a guanidine catalyst, an amidine catalyst, a phosphazene catalyst, imidazole, triethanolamine, potassium tert-butoxide, and mixtures thereof.

2. The method for preparing a high molecular weight furan polyamide according to claim 1, wherein the guanidine catalyst is: 1,5,7-triazabicyclo[4.4.0]dec-5-ene, 7-methyl-1,5,7-triazabicyclo[4.4.0]dec-5-ene, 2,3,5,6-tetrahydro-1H-imidazo[1,2-A]imidazole or tetramethyl guanidine; the amidine catalyst is 1,8-diazabicyclo[5.4.0]undec-7-ene or 1,5-diazabicyclo[4.3.0]non-5-ene; and the phosphazene catalyst is 2-tert-butylimino-2-diethylamino-1,3-dimethylperhydro-1,3,2-diazaphosphorine or 1-tert-butyl-2,2,4,4,4-pentakis(dimethylamino)-2λ5,4λ5-catenadi(phosphazene).

3. The method for preparing a high molecular weight furan polyamide according to claim, wherein, in the step 1), the aliphatic diamine has a carbon number of 2-10.

4. The method for preparing a high molecular weight furan polyamide according to claim 1, wherein the step 1) comprises: charging dimethyl furan dicarboxylate and aliphatic diamine into the reaction container at the equal molar weight, and purging with inert gas or vacuumizing for 5-30 min; and then at the atmospheric pressure, heating the reaction system to 60-120° C. in an inert gas atmosphere with a flow rate of 100-1,000 ml/min.

5. The method for preparing a high molecular weight furan polyamide according to claim 1, wherein, in the step 2), the amount of the catalyst added is 5-6% of the molar weight of dimethyl furan dicarboxylate or aliphatic diamine.

* * * * *